US005844953A

United States Patent [19]
Heck et al.

[11] Patent Number: 5,844,953
[45] Date of Patent: Dec. 1, 1998

[54] METHOD FOR COMMON TRANSMISSION OF DIGITAL SOURCE AND CONTROL DATA BETWEEN DATA SOURCES AND DATA SINKS CONNECTED THROUGH DATA LINES

[75] Inventors: Patrick Heck, Durmersheim; Herbert Hetzel, Weingarten, both of Germany

[73] Assignee: Becker GmbH, Karlsbad, Germany

[21] Appl. No.: 595,838

[22] Filed: Feb. 2, 1996

[30] Foreign Application Priority Data

Feb. 2, 1995 [DE] Germany .................. 195 03 215.2

[51] Int. Cl.$^6$ .................................................. H04L 25/38
[52] U.S. Cl. ........................... 375/369; 370/522; 370/305
[58] Field of Search ........................... 375/369; 370/522, 370/528, 509, 510, 305

[56] References Cited

U.S. PATENT DOCUMENTS

| 4,397,020 | 8/1983 | Howson ................................... 370/105 |
| 4,437,183 | 3/1984 | Profet ................................... 370/110.1 |
| 4,512,026 | 4/1985 | Vander Meiden ...................... 375/114 |
| 4,796,282 | 1/1989 | Yoshida ................................... 375/116 |
| 4,833,674 | 5/1989 | Takai et al. ............................... 370/95 |
| 5,263,054 | 11/1993 | Davis et al. ............................... 375/94 |
| 5,271,008 | 12/1993 | Limb ....................................... 370/85.1 |
| 5,475,716 | 12/1995 | Huang ..................................... 375/354 |
| 5,513,173 | 4/1996 | Machemer et al. ........................ 370/17 |
| 5,528,579 | 6/1996 | Wadman et al. .......................... 370/15 |
| 5,608,730 | 3/1997 | Osukabe et al. ......................... 370/471 |
| 5,684,806 | 11/1997 | Akiyama ................................. 370/522 |

*Primary Examiner*—Stephen Chin
*Assistant Examiner*—Mohammad Ghayour
*Attorney, Agent, or Firm*—Herbert L. Lerner; Laurence A. Greenberg

[57] ABSTRACT

A method for common transmission of digital source and control data between data sources and sinks being connected by data lines, includes transmitting the source and control data in a format prescribing a clocked sequence of individual bit groups of equal length. In each bit group, there are one or more and in particular two control bits, which are used for the transmission of control signals. One control signal is assigned bitwise to the control bits of successive bit groups. A starting identification code which is identical for all of the control signals is provided at the beginning of each control signal.

14 Claims, 3 Drawing Sheets

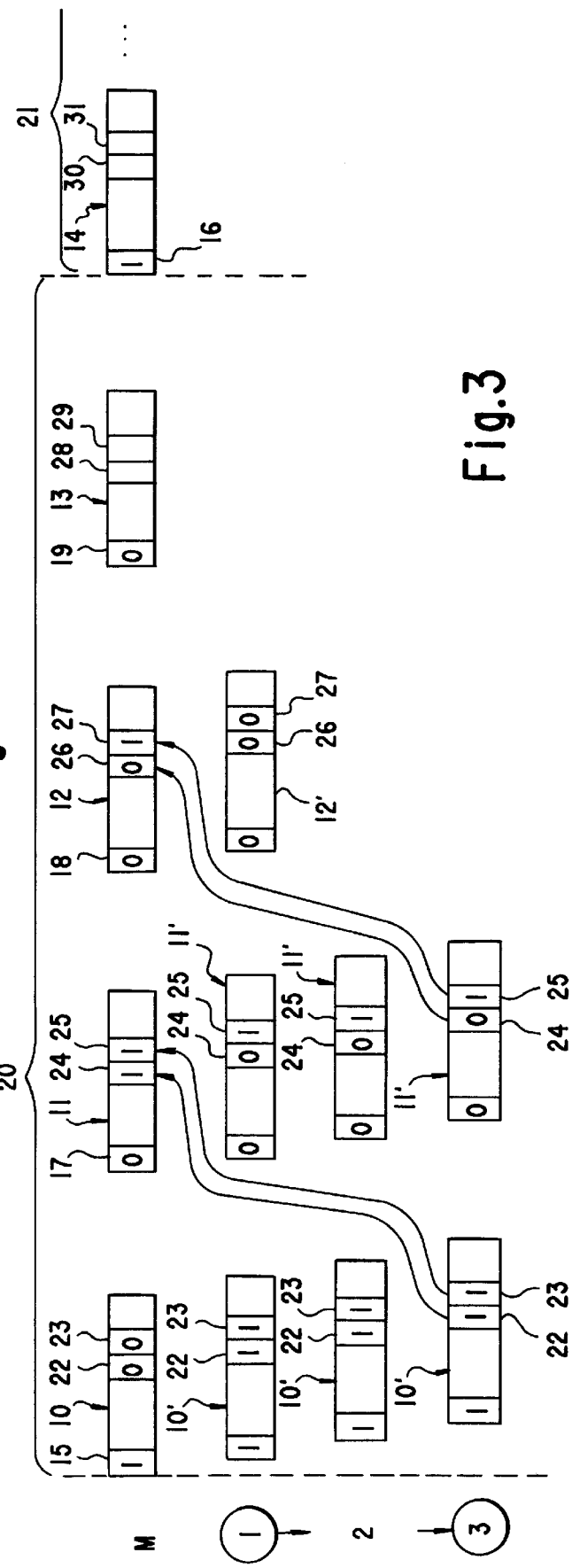

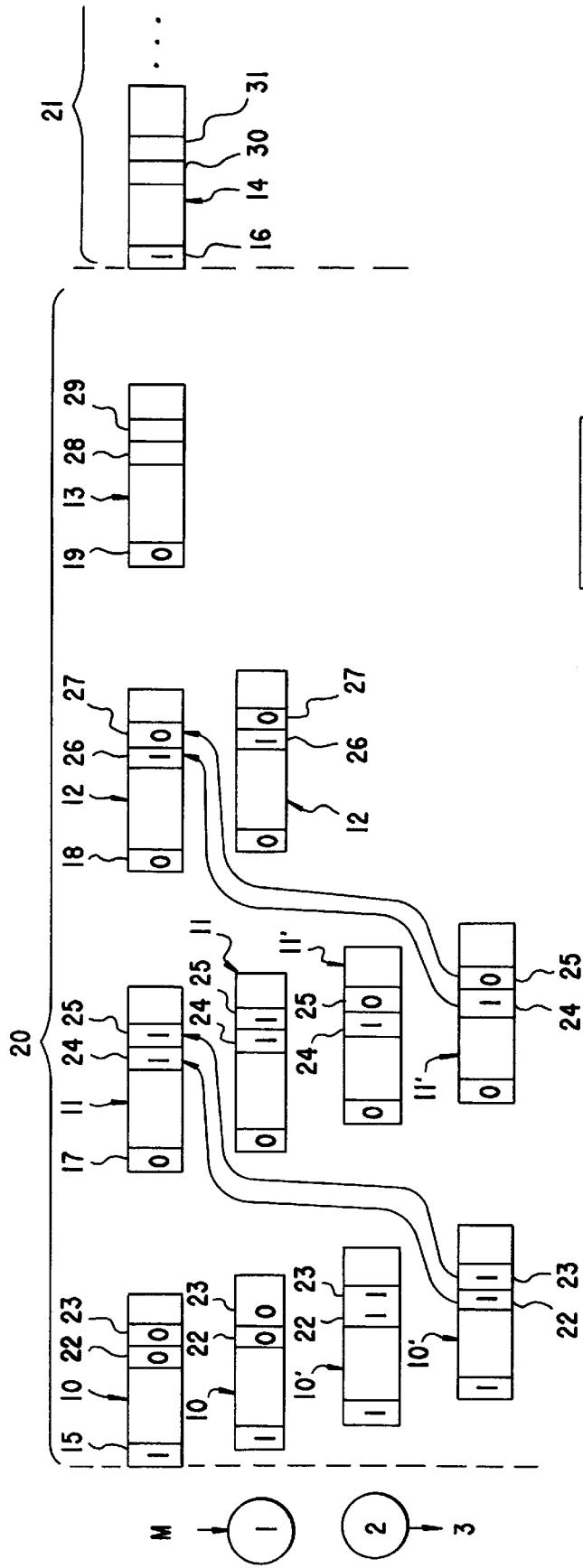
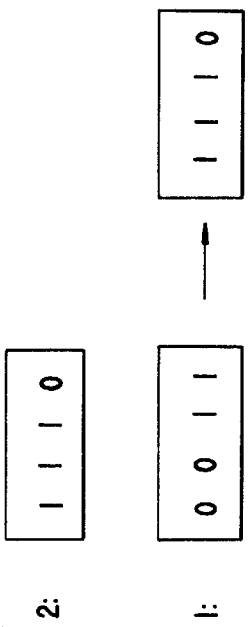
Fig.4
Fig.5

METHOD FOR COMMON TRANSMISSION OF DIGITAL SOURCE AND CONTROL DATA BETWEEN DATA SOURCES AND DATA SINKS CONNECTED THROUGH DATA LINES

BACKGROUND OF THE INVENTION

Field of the Invention

The invention relates to a method for common transmission of digital source and control data between data sources and sinks connected through data lines in a network of ring-shaped architecture, in which the source and control data are transferred in a format that prescribes a clocked sequence of individual bit groups of equal length. Through the data line the source and control data are transferred in a continuous data stream which is synchronous to a clock signal. The clock signal is generated by a single subscriber. All other subscribers synchronize themselves to that clock signal. Purely asynchronous data transmitting processes have to be differentiated therefrom as packet or package-oriented data transmission processes, for example ATM-processes.

Methods of that type are used wherever different electrical and electronic devices that are intended to exchange information with one another are linked to one another through the use of data lines in what is sometimes a complicated way. In the audio field, for instance, communication between interlinked data sources on one hand, such as CD players, radio receivers and cassette tape recorders, as well as the data sinks connected with them on the other hand, such as amplifier-speaker combinations, can be controlled by such a method.

In the course of development of CD players, the so-called SPDIF format (Sony/Philips Digital Interface Format), which is also known by the designation IEC 958, has become established as the standard. That format prescribes the transmission of the data in a frame which includes two subframes or bit groups. Each subframe includes a preamble of four bits for control data, followed by 24 bits for source data and ending with four bits for special control data. One subframe of each frame is assigned to the left audio channel, and the other subframe is assigned to the right audio channel.

The rigid structure of that format is disadvantageous, since control data, which play an important role in data transmission in complex communications systems, can be transmitted only to a small extent.

SUMMARY OF THE INVENTION

It is accordingly an object of the invention to provide a method for common transmission of digital source and control data between data sources and data sinks connected through data lines, which overcomes the hereinafore-mentioned disadvantages of the heretofore-known methods of this general type and with which a large number of different control signals can be transmitted. The control signals should be as simple and time-saving to evaluate as possible.

With the foregoing and other objects in view there is provided, in accordance with the invention, a method for common transmission of digital source and control data between data sources and sinks being connected by data lines, which includes transmitting the source and control data in a format prescribing a clocked sequence of individual bit groups of equal length, which comprises providing each bit group with at least one and in particular two control bits being used for the transmission of control signals; assigning one control signal bitwise to the at least one control bit of successive bit groups; and providing a starting identification code being identical for all of the control signals at the beginning of each control signal.

Due to the bitwise deposition of the control signals in the control bits of successive bit groups, a large number of the most varied control signals with great lengths can be transmitted. Each of the interlinked devices can detect the beginning of a control signal very simply by checking the control bits for the starting identification code, which is identical for all of the control signals.

In accordance with another mode of the invention, a plurality of successive bit groups are combined into one block, and a block beginning identification code is assigned each to a certain bit position within the first bit group of a block.

In accordance with a further mode of the invention, a block includes 96 bit groups.

By combining a plurality of successive bit groups into one block, reference points within the sequence of successively transmitted individual bit groups are created in the form of the beginning of the blocks. Since the control bits of each bit group each have the same, fixedly defined spacing from the beginning of the applicable bit group, each control bit of a block is spaced apart by a fixedly specified distance from the beginning of the block. If the beginning of a transmission of a control signal is allowed only for a certain bit group, then beginning at the block beginnings being detected from the block beginning identification code, the starting identification code of the control signal being transmitted can be found very simply and in a time-saving way.

In accordance with an added mode of the invention, the starting identification code is assigned to the control bits of the first bit group of each block. In this way, control signals can each begin only in the control bits of the first bit group of a block and thus can be very easily recognized and evaluated.

In accordance with an additional mode of the invention, the length of the control signals is less than the number of control bits present in one block. As a result, in the case of shifting of a control signal within a block, for instance from delays in transmission, it can be assured that the entire control signal is transmitted within one block. In this way, upon the beginning of the next block, a new control signal can be transmitted.

In accordance with yet another mode of the invention, all of the control signals are of equal length. As a result, on one hand simple evaluation of the control signals is possible, since a fixed length can be assumed. On the other hand, a number of "reserve control bits" that are available in the event of a shifting of the control signal within a block is the same for all control signals, so that for all of the control signals the same allowable maximum shift can be specified.

In accordance with yet a further mode of the invention, optical fibers and/or electrical lines are used as data lines. Particularly when fiber optics are used, data transmission at very speed is possible. Moreover, the use of fiber optics leads to an especially low weight and therefore good utility especially in mobile systems, such as in a motor vehicle.

In accordance with yet an added mode of the invention, the encoding of the individual bits is carried out through the use of biphase coding. In this way, the clock signal coded into the data signal can be transmitted together with it within the network.

Preferably, the clock signal generated by a data source/data sink being used as a master is taken over by the other data sources/data sinks through the use of a PLL circuit, so that all of the data sources and sinks work in synchronism with the clock generated by the master.

The method is not limited to the transmission of audio data but instead it can also be used to transmit arbitrary data, such as fax data, status data, telephone card data or other control data. For instance, besides the audio devices mentioned at the outset, video cameras, video-CD players, telephones, fax machines, microphones, CD-ROMs, or computer hard disks can be linked together. Furthermore, particularly in motor vehicles, control and monitoring units can also be included in the network. For example, it is possible to incorporate devices for monitoring the function of outside lights or the tire pressure or of devices for measuring or controlling the engine rpm or the charge pressure of a turbocharger. In this way, if the tire pressure is dropping, for instance, the audio system can issue a warning in the form of a memorized text over the speaker.

In accordance with yet an additional mode of the invention, the method is used in a communication system which includes a plurality of network subscribers connected to one another through a ring-like network, for the transmission of control signals of a first network subscriber to a second network subscriber over the network, wherein one network subscriber is used as a master, which sends the bit groups at certain time intervals, the first network subscriber receives the bit groups sent by the master, assigns one or more control signals to the control bits, and forwards the bit groups to the next network subscriber in the ring, and the master reads out the content of the control bits from bit groups that it has received and assigns the control bits to the next bit group to be sent.

In this way, control signals can be transmitted from a first network subscriber to a second network subscriber, even if disposed between these two network subscribers is a network subscriber being used as the master. The sequence of control bits which each form one control signal remains unchanged in this way. All that can happen is a shift of the entire control signal, as a result of the conversion of the control bits in the master, from the current bit group to the next bit group to be sent.

In accordance with again another mode of the invention, the second network subscriber detects the start of the control signals from the starting identification code in each case, which is assigned to one or more certain bit positions of a bit group. In this way, the second network subscriber detects the start of a control signal even if this start has been shifted, as a result of the conversion in the master, from the control bits of the original bit group to the control bits of a bit group that follows it. It is not until the starting identification code of a control signal has been detected that the control bits of the next bit groups are evaluated, beginning at the starting identification code.

In accordance with again a further mode of the invention, the first network subscriber assigns the starting identification code to the control bits of the first bit group of each block. As a result, it is assured on one hand that as a function of the number of network subscribers being present and the delay in transmission which is dependent on that number, a control signal can begin in only one of the first bit groups of a block. Due to this, the network subscribers need merely check the first bit groups of a block for the starting identification code of a control signal, with the result being simplification and a saving of time. On the other hand, it is assured that given a suitable choice of the length of a control signal, the entire control signal comes to be located within one block, and the end of the control signal does not extend into the next block.

In accordance with again an added mode of the invention, after the assignment of the starting identification code by the first network subscriber, the control bits are blocked for transmission of control signals for all of the other network subscribers, in particular until the next beginning of a block. In this way, each network subscriber can tell from the starting identification code that within a current block a control signal is already being transmitted from another network subscriber, so that the transmission of the control signal of the first network subscriber cannot be carried out until within the next block. If the starting identification code is not discovered within the first bit group of a block by a network subscriber that seeks to transmit a control signal, then this network subscriber assigns the starting identification code to the control bits of the first bit group of the block, so that this block is considered by all of the other network subscribers to be occupied.

The use of the starting identification code as an occupation identification code at the same time results in a very space-saving, simple-to-evaluate encoding within the transmission format being used.

In accordance with again an additional mode of the invention, the method is used in a stationary communications system, in particular in a household communications system. This may involve a so-called multimedia network system, which is composed of the most varied network subscribers that generate and/or process audio, video, control and other data.

In accordance with a concomitant mode of the invention, the method is highly advantageously usable in a mobile communications system, in particular a communications system in a motor vehicle. It is precisely the rising number of electronic devices used in a motor vehicle and the necessary communication between these devices that can lead to an advantageous use of the method of the invention.

One advantage of the invention is that a number of different control signals can be transmitted between different subscribers in a communications system. The control signals can be detected and evaluated very simply and in a time-saving way even if there is a shift which is caused, for instance, by delays in transmission.

Other features which are considered as characteristic for the invention are set forth in the appended claims.

Although the invention is illustrated and described herein as embodied in a method for common transmission of digital source and control data between data sources and data sinks connected through data lines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 2 is a diagrammatic view of bit group blocks showing a transmission of a control signal from one network subscriber to another network subscriber in the network shown in FIG. 1, with the method according to the invention;

FIG. 3 is a diagrammatic view of the control signal as it is sent and received by network subscribers of FIG. 2;

FIG. 4 is a view similar to FIG. 2 showing the transmission of a control signal from one network subscriber to another network subscriber in the network of FIG. 1 with the method according to the invention and with the transmission of the control signal taking place by way of the master; and FIG. 5 is a view similar to FIG. 3 showing the control signal as sent and received by the network subscribers of FIG. 4, wherein the control signal is of the kind which is received if the method according to the invention is not used.

DESCRIPTION OF THE PREFERRED EMBODIMENTS

Figure 1:
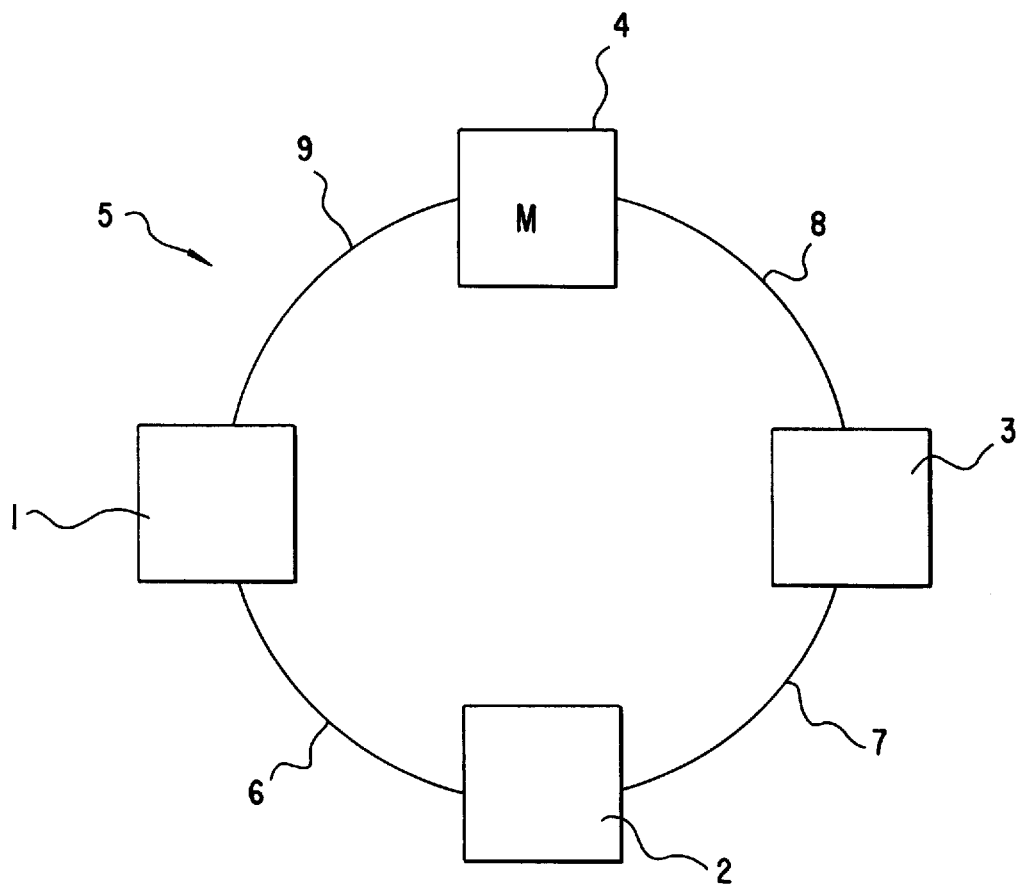
FIG. 1 is a block circuit diagram of a ring-like network including four network subscribers.

Referring now to the figures of the drawing in detail and first, particularly, to FIG. 1 thereof, there is seen a ring-like network 5 that includes three network subscribers 1, 2, 3 and a network subscriber 4 being used as a master. The network subscribers 1, 2, 3, 4 are connected to one another in a ring by line segments 6, 7, 8, 9.

In FIG. 2, the transmission of data between the individual subscribers 1, 2, 3 and the master (M) 4 is shown diagrammatically. The master 4, at certain time intervals, sends bit groups 10, 11, 12, 13, 14 to the network subscriber 1 over the line segment 9.

A first bit 15 of the bit group 10 and a first bit 16 of the bit group 14 are occupied with a 1 as a block beginning identification code, while first bits 17, 18, 19 of the bit groups 11, 12, 13 are each occupied by a zero. In this way, the bit groups 10, 11, 12, 13 are combined into a block 20, while the bit group 14 forms a first bit group of a block 21 following it.

The bit groups 10, 11, 12, 13, 14 each include two control bits 22, 23, 24, 25, 26, 27, 28, 29, 30, 31, and each of the control bits 22, 23 is occupied by a zero beforehand by assignment from the master.

Once the first bit group 10 has been sent by the master M to the network subscriber 1 over the line segment 9, it is received by that network subscriber. Since the network subscriber 1 seeks to transmit a control signal to the network subscriber 3, it enters a starting identification code "11" into the control bits 22, 23 of the receiving bit group 10 and sends this modified bit group 10' to the network subscriber 2 over the line segment 6. Since there is a time lag between receiving and sending of the bit group 10, 10' as a result of the occupation of the control bits 22, 23, the bit group 10' is shown laterally offset from the bit group 10.

The network subscriber 2 receives the bit group 10 and it learns from the starting identification code "11" stored in memory in the control bits 22, 23, that with the bit group 10', the beginning of a control signal is being transmitted.

Next, the network subscriber 2 transmits the bit group 10' unaltered over the line segment 7 to the network subscriber 3, which is the actual receiver of the control signal. This subscriber, like the network subscriber 2, tells from the starting identification code "11" which is memorized in the control bits 22, 23 that a control signal is being transmitted.

The network subscriber 3 sends the bit group 10' over the line segment 8 to the master 4. The master reads out the starting identification code "11" from the control bits 22, 23 of the bit group 10' and transmits it to the control bits 24, 25 of the next bit group 11 to be sent.

At the next possible moment, which is specified by the clock rate, the master 4 sends the new bit group 11 over the line segment 9 to the network subscriber 1. This network subscriber overwrites the control bits 24, 25 with a bit sequence "01", thus specifying both the network subscriber 3 as a receiver and the function that this network subscriber is to perform. Next, the network subscriber 1 sends the modified bit group 11' over the line segment to the network subscriber 2. As already described, a time lag, which is shown by a lateral shift of the bit group 11' relative to the bit group 11, arises between the receiving and sending of the bit group.

Once the network subscriber 2 has received the bit group 11', it detects from the control bits 24, 25 occupied by the bit sequence "01" that it is not the receiver of this control signal, and it sends the bit group 11' unaltered over the line segment 7 to the network subscriber 3. This network subscriber tells from the control bits 24, 25 occupied with the bit sequence "01" that it is intended as the receiver of the control signal, and it performs the appropriate function.

Next, the network subscriber 3 transmits the bit group 11' unaltered over the line segment 8 to the master 4, whereupon the master assigns the bit sequence "01" which is stored in memory in the control bits 24, 25, to the check bits 26, 27 of the next bit group 12 to be sent.

At the specified moment, the master 4 sends the next bit group 12 over the line segment 9 to the network subscriber 1, which resets the control bits 26, 27 of the bit group 12, or in other words occupies them with a bit sequence "00". Since in the above example a fixed length of four bits for the control signals has been assumed, no special ending identification code of the control signals is needed.

FIG. 3 shows the control signal "1101" which is transmitted by the network subscriber 1. This signal is received correctly as "1101" by the network subscriber 3 which is specified as the receiver, beginning at the first bit group 10' of the block 20.

FIG. 4 diagrammatically shows the transmission of a control signal "1110" from the network subscriber 2 to the network subscriber 1. Due to the transmission through the master 4, a shift by one bit group on the part of the control signal occurs:

At the beginning of the block 20, as is described in conjunction with FIG. 2, a bit group 10 is first sent by the master 4 over the line segment 9 to the network subscriber 1. Since in the present case the network subscriber 1 does not seek to transmit any control signal, it merely sends the unaltered bit group 10 over the line segment 6 to the network subscriber 2.

The latter network subscriber can tell from the missing starting identification code "11" in the control bits 22, 23 of the bit group 10 that within the block 20 as yet no network subscriber has sent out a control signal, and it accordingly occupies the control bits 22, 23 with the starting identification code "11". Next, the network subscriber 2 sends the altered bit group 10' over the line segment 7 to the network subscriber 3.

The network subscriber 3 can tell from the starting identification code "11" in the control bits 22, 23 of the bit group 10' that a control signal is being transmitted, and it sends the bit group 10' onto the master 4 over the line segment 8.

The master 4 transmits the starting identification code "11", which is assigned to the control bits 22, 23 of the bit group 10', to the control bits 24, 25 of the next bit group 11 to be sent. At the next possible moment, the master 4 sends the bit group 11 over the line segment 9 to the network subscriber 1. This network subscriber detects the beginning of a control signal from the bit sequence "11", which has been assigned to the control bits 24, 25 for the first time since the beginning of the block, and which represents the starting identification code of a control signal, and sends the bit group 11 on to the network subscriber 2 unaltered over the line segment 6.

The network subscriber 2 overwrites the control bits 24, 25 of the bit group 11 with the bit sequence "10", which identifies the network subscriber 1 as the receiver and at the same time represents the control code for a function to be performed by that network subscriber.

Next, the network subscriber 2 sends the thus-altered bit group 11' over the line segment 7 to the network subscriber 3, which can tell from the bit sequence "10" assigned to the control bits 24, 25 that it is not the receiver of the control signal. The network subscriber 3 thus sends the bit sequence 11 on to the master 4 over the line segment 8.

The master 4 likewise can tell from the bit sequence "10" that it is not intended as the receiver for the control signal, and it transmits the bit sequence "10", which is assigned to the control bits 24, 25 of the bit group 11', to the control bits 26, 27 of the next bit sequence 12 to be sent. At the next possible moment, the master 4 sends the bit group 12 over the line segment 9 to the network subscriber 1. This network subscriber can tell, from the bit sequence "10" assigned to the control bits 26, 27 of the bit group 12, that it is the receiver of the control signal, and it executes the appropriate function.

FIG. 5 shows the bit sequence "1110" which is sent as a control signal by the network subscriber 2, along with a bit sequence "0011" which results if the network subscriber 1 intended as the receiver of the control signal were to combine the control signal from the control bits 22, 23 and 24, 25, always beginning with the control bits of the first bit group of a block. As a result of the evaluation of the starting identification code of the control signal, in accordance with the invention, it is possible for the correct control signal "1110" to be decoded by the network subscriber 1.

Care must be taken to ensure that the length of the control signal, which is four bits, is chosen to be shorter than the number of control bits 22, 23, 24, 25, 26, 27, 28, 29 available in the block 20, which are eight in number. In this way, a shift of the control signal within the block 20 by two bits, or in other words by one bit group, is possible without the control bits 30, 31 of the first bit group 14 of the next block 21 being overwritten by the control signal. In order to allow longer delays, the number of control bits per block can be increased for the same control signal length.

Moreover, it can be seen, for instance from the above description of FIG. 4, that the starting identification code "11" assigned to the control bits 22, 23 of the bit group 10' can by way of example also be used by the network subscriber 3 in order to detect an occupation of the block 20 with an already-transmitted control signal. In the event that in the course of events described in conjunction with FIG. 4, in addition to the network subscriber 2, the network subscriber 3 would like to transmit a control signal, then the latter network subscriber can tell from the starting identification code "11" that it is no longer possible to transmit a further control signal within the block 20.

We claim:

1. In a method for common transmission of digital source and control data between data sources and sinks being connected by data lines, which includes transmitting the source and control data in a format prescribing a clocked sequence of individual bit groups of equal length, the improvement which comprises:

combining a plurality of successive bit groups into a block, and assigning a respective block beginning identification code to a certain bit position within a first bit group of the block;

defining at least one bit of each bit group, respectively, as a control bit for the transmission of control signals;

transmitting a control signal bitwise with the control bits of successive bit groups;

providing a starting identification code being identical for all of the control signals at the beginning of each control signal, whereby the starting identification code of the control signals does not have a fixed relation to the block beginning identification code of each corresponding block; and setting a length of the control signals to be less than a number of the control bits present in one block.

2. The method according to claim 1, which comprises defining each bit group with two control bits for the transmission of the control signals.

3. The method according to claim 1, which comprises combining 96 successive bit groups into one block, and assigning a respective block beginning identification code to a certain bit position within a first bit group of a block.

4. The method according to claim 1, which comprises dimensioning all of the control signals to be of equal length.

5. The method according to claim 1, which comprises connecting the data sources and sinks with at least one of optical fibers and electrical lines as the data lines.

6. The method according to claim 1, which comprises encoding individual bits by biphase coding.

7. In a method for common transmission of digital source and control data between data sources and sinks being connected by data lines, which includes transmitting the source and control data in a format prescribing a clocked sequence of individual bit groups of equal length, the improvement which comprises:

defining at least one bit of each bit group as a control bit for the transmission of control signals;

transmitting a control signal bitwise with the control bits of successive bit groups;

providing a starting identification code being identical for all of the control signals at the beginning of each control signal;

connecting a plurality of network subscribers in a communication system to one another through a ring-like network for the transmission of control signals of a first network subscriber to a second network subscriber over the network;

sending the bit groups from one network subscriber being used as a master at certain time intervals;

sending the bit groups from the master to the first network subscriber, assigning at least one control signal to the at least one control bit with the first network subscriber, and forwarding the bit groups from the first network subscriber to the next network subscriber in the ring; and reading out the content of the at least one control bit with the master from bit groups that it has received and assigning the at least one control bit to the next bit group to be sent, with the master.

8. The method according to claim 7, which comprises detecting the start of the control signals, in each case with the second network subscriber, from the starting identification code being assigned to at least one certain bit position of a bit group.

9. The method according to claim 7, which comprises assigning the starting identification code to the at least one control bit of the first bit group of each block with the first network subscriber.

10. The method according to claim 7, which comprises blocking the at least one control bit for transmission of control signals for all of the other network subscribers, after the assignment of the starting identification code by the first network subscriber.

11. The method according to claim 10, which comprises blocking the at least one control bit until the next beginning of a block.

12. In a method for common transmission of digital source and control data between data sources and sinks being connected by data lines, which includes transmitting the source and control data in a format prescribing a clocked sequence of individual bit groups of equal length, the improvement which comprises:

defining at least one bit of each bit group, as a control bit for the transmission of control signals;

transmitting a control signal bitwise with the control bits of successive bit groups;

providing a starting identification code being identical for all of the control signals at the beginning of each control signal;

connecting a plurality of network subscribers in a stationary communications system, in particular a communications system in the home, to one another through a ring-like network for the transmission of control signals of a first network subscriber to a second network subscriber over the network;

sending the bit groups from one network subscriber being used as a master at certain time intervals;

sending the bit groups from the master to the first network subscriber, assigning at least one control signal to the at least one control bit with the first network subscriber, and forwarding the bit groups from the first network subscriber to the next network subscriber in the ring; and reading out the content of the at least one control bit with the master from bit groups that it has received and assigning the at least one control bit to the next bit group to be sent, with the master.

13. In a method for common transmission of digital source and control data between data sources and sinks being connected by data lines, which includes transmitting the source and control data in a format prescribing a clocked sequence of individual bit groups of equal length, the improvement which comprises:

defining at least one bit of each bit group, as a control bit for the transmission of control signals;

transmitting a control signal bitwise with the control bits of successive bit groups;

providing a starting identification code being identical for all of the control signals at the beginning of each control signal;

connecting a plurality of network subscribers in a mobile communications system, in particular a communications system in a motor vehicle, to one another through a ring-like network for the transmission of control signals of a first network subscriber to a second network subscriber over the network;

sending the bit groups from one network subscriber being used as a master at certain time intervals;

sending the bit groups from the master to the first network subscriber, assigning at least one control signal to the at least one control bit with the first network subscriber, and forwarding the bit groups from the first network subscriber to the next network subscriber in the ring; and reading out the content of the at least one control bit with the master from bit groups that it has received and assigning the at least one control bit to the next bit group to be sent, with the master.

14. In a method for common transmission of digital source and control data between data sources and sinks being connected by data lines, which includes transmitting the source and control data in a format prescribing a clocked sequence of individual frames of equal length, the improvement which comprises:

combining a plurality of bits into a frame;

defining at least one bit of each frame as a control bit for the transmission of control signals;

combining a plurality of successive frames into one block, and assigning a respective block beginning identification code to a certain bit position within a first frame of a block;

transmitting a control signal bitwise with the control bits of successive frames;

providing a starting identification code being identical for all of the control signals at the beginning of each control signal; and setting a length of the control signals to be less than a number of the control bits present in one block.

* * * * *